United States Patent
Turvey et al.

(10) Patent No.: US 7,264,120 B2
(45) Date of Patent: Sep. 4, 2007

(54) CONTAINER LID INFORMATION DIAL KIT

(75) Inventors: Robert R. Turvey, Sanford, MI (US); Lawrence C. Stanos, Midland, MI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 112 days.

(21) Appl. No.: 10/832,687

(22) Filed: Apr. 27, 2004

(65) Prior Publication Data

US 2005/0236293 A1   Oct. 27, 2005

(51) Int. Cl.
  A45C 11/20   (2006.01)
  B65D 85/00   (2006.01)
  G09F 9/00    (2006.01)
  A21D 10/02   (2006.01)

(52) U.S. Cl. .............. 206/542; 40/312; 116/309; 206/459.1; 426/112

(58) Field of Classification Search ............. 206/459.1, 206/534, 576–577, 541–549; 116/308–309; 215/230; D8/306–307; 40/306–307; 426/106–130
See application file for complete search history.

(56) References Cited

U.S. PATENT DOCUMENTS

| | | | |
|---|---|---|---|
| 169,992 A | 11/1875 | Hawkins | |
| 261,131 A | 7/1882 | Bonshire | |
| 571,436 A | 11/1896 | Glentworth | |
| 2,201,524 A | 5/1940 | Esty | |
| 2,706,464 A | 4/1955 | North | |
| 2,713,845 A | 7/1955 | Silverman | |
| 2,739,564 A | 3/1956 | North | |
| 3,111,219 A * | 11/1963 | Huey | 206/576 |
| 3,392,468 A | 7/1968 | Wolf | |
| 3,637,949 A * | 1/1972 | Ruster et al. | 379/369 |
| 3,818,858 A | 6/1974 | Kramer et al. | |
| 3,974,916 A | 8/1976 | Bartolucci | |
| 4,041,628 A | 8/1977 | Sasson | |
| 4,227,613 A | 10/1980 | Seitz | |
| 4,347,804 A * | 9/1982 | Villa-Real | 116/308 |
| 4,619,221 A | 10/1986 | Linstromberg | |
| 4,621,670 A | 11/1986 | Yuen | |
| 4,662,520 A | 5/1987 | Griffin | |
| 4,985,879 A | 1/1991 | Owens | |
| 5,128,503 A * | 7/1992 | Frantz | 200/336 |
| 5,358,117 A | 10/1994 | Adams | |
| D365,251 S * | 12/1995 | Lo | D7/629 |
| 5,694,882 A | 12/1997 | Marshall | |

(Continued)

*Primary Examiner*—Bryon P. Gehman (57) ABSTRACT

A container lid includes a recess that rotatably houses a dial. The dial may be manufactured from the material of the package in which the lid is sold, or the package in which an item being stored in the container is sold. The dial includes a handle that is pivotable between a stowed position folded into an upper surface of the dial and an operative position pivoted away from the upper surface of the dial. In a first disclosed example, the dial includes information displayed thereon, while the lid includes a pointer that generally points toward the recess. To point to a particular information on the dial, the dial can be rotated until the pointer generally points to the particular information on the dial. In a second disclosed example, the lid includes information displayed thereon around the recess, while the dial includes a pointer that points radially outward. To point to a particular information on the lid, the dial can be rotated until the pointer generally points to the particular information on the lid.

10 Claims, 6 Drawing Sheets

U.S. PATENT DOCUMENTS

| | | |
|---|---|---|
| 5,720,392 A | 2/1998 | Price |
| 5,803,283 A * | 9/1998 | Barker et al. ............... 215/230 |
| 5,984,122 A * | 11/1999 | Barker et al. ............... 215/230 |
| 6,000,159 A | 12/1999 | Hornung |
| D428,777 S | 8/2000 | Hayes et al. |
| D439,744 S | 4/2001 | Ho |
| D440,470 S | 4/2001 | Tucker et al. |
| D440,830 S | 4/2001 | Tucker et al. |
| D443,184 S | 6/2001 | Maxwell et al. |
| D443,484 S | 6/2001 | Maxwell et al. |
| D443,798 S | 6/2001 | Tucker et al. |
| D445,649 S | 7/2001 | Maxwell et al. |
| D445,650 S | 7/2001 | Maxwell et al. |
| D449,495 S | 10/2001 | Tucker et al. |
| 6,305,546 B1 | 10/2001 | Saunders et al. |
| D450,537 S | 11/2001 | Hayes |
| D450,983 S | 11/2001 | Tucker et al. |
| 6,397,503 B1 | 6/2002 | Cain et al. |
| D463,726 S * | 10/2002 | Becker ....................... D8/306 |
| 6,912,968 B2 * | 7/2005 | Carbajal ..................... 116/308 |
| 7,017,762 B2 * | 3/2006 | Shane ......................... 215/230 |
| 7,032,535 B2 * | 4/2006 | Halstead et al. ............ 116/308 |
| 2003/0222045 A1 * | 12/2003 | Shane ......................... 215/230 |
| 2004/0144677 A1 * | 7/2004 | Miller ...................... 206/459.1 |

* cited by examiner

CONTAINER LID INFORMATION DIAL KIT

FIELD OF THE DISCLOSURE

The present disclosure generally relates to storage containers, and more particularly, to a container lid information dial.

BACKGROUND OF THE DISCLOSURE

Reusable storage containers have been in use for many years and enable consumers to store food products therein. Most currently available food storage containers do not include any indicator to enable the user to display information about a food that is stored in the container. For example, typical food storage containers do not have an indicator to mark the date when the food was placed in the container. Quite often, these containers are placed in the refrigerator or freezer without any date indicator at all. In the event that the food is not spoiled to the point that it is visibly noticeable to the consumer, there is a possibility that the consumer will eat the spoiled food and become sick.

To display information on a container, various methods have been devised. One such method is the use of freezer tape, which is essentially a tape upon which notes and other indicia can be written. This tape is placed on the lid of the food storage container and information about the food is written on the tape. Another method consists of providing date information on a container by using arms reminiscent of a clock. Numerous other devices have been attempted for display of information on a container, such as the use of dimples or deformable surfaces for indicating the contents of disposable, fast food beverage containers.

The above-described prior art methods typically have an information display device that is either manufactured with the lid or permanently attached to the lid. Accordingly, the information on the information display device cannot be easily changed or updated with different or new information that corresponds with a change in the contents of a container for which the lid is used.

Thus, there is a need for an information display device that is simple to manufacture, can be updated or changed depending on the contents of the container for which the lid is used, and can be provided to a consumer depending on the needs of the consumer regarding a particular use of a lid on which the information display device will be used.

SUMMARY

In accordance with one aspect of the disclosure, a container lid includes a recess, a dial and a pointer. The dial is rotatably housed in the recess and includes a handle pivotable between a stowed position folded into a plane of the dial and an operative position pivoted away from the plane of the dial. The pointer provides a position of the dial in the recess.

In accordance with another aspect of the disclosure, a kit includes packaging material comprising an information dial, and a container lid having a recess sized to receive the information dial.

In accordance with another aspect of the disclosure, a method of indicating information pertaining to the contents of a container includes removing an information dial from packaging material, and mounting the information dial in a recess in a lid of the container.

These and other aspects and features of the disclosure will be more readily understood upon reading the following detailed description when taken in conjunction with the accompanying drawings.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions and equivalents falling within the spirit and scope of the disclosure as defines by the appended claims.

DETAILED DESCRIPTION OF THE DISCLOSURE

Figure 1:
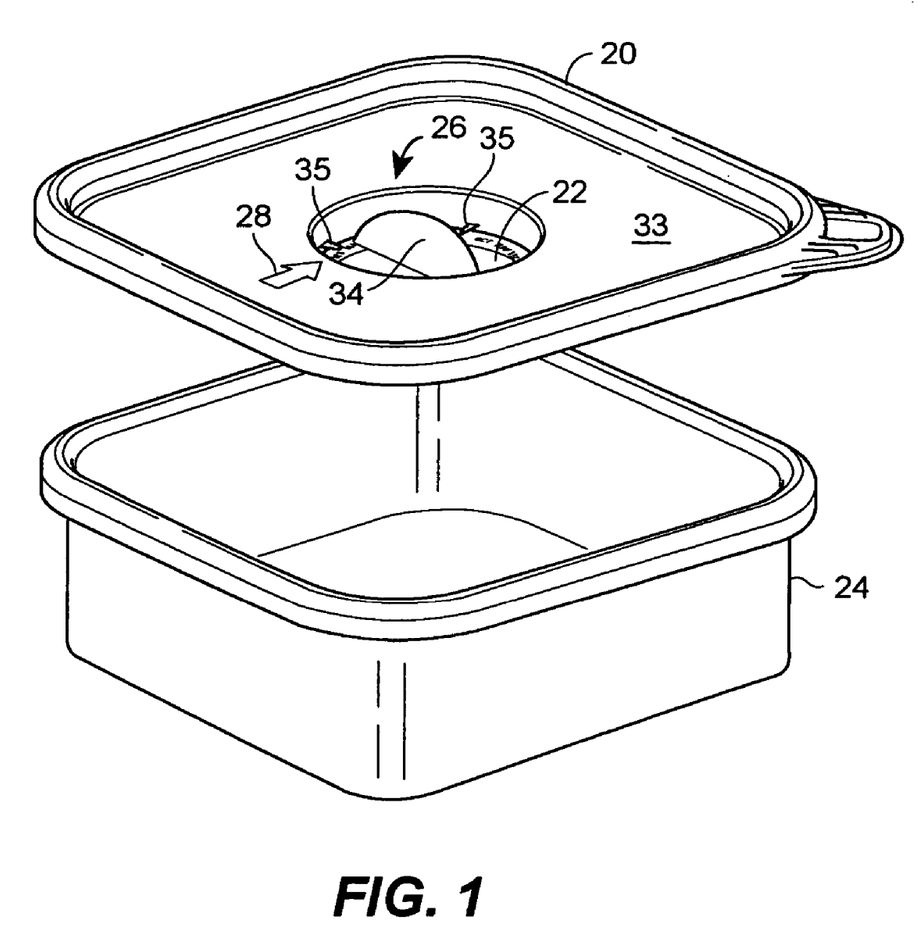
FIG. 1 is an exploded perspective view of a container with a lid and a dial constructed in accordance with the teachings of a first example of the present disclosure.
Figure 2:
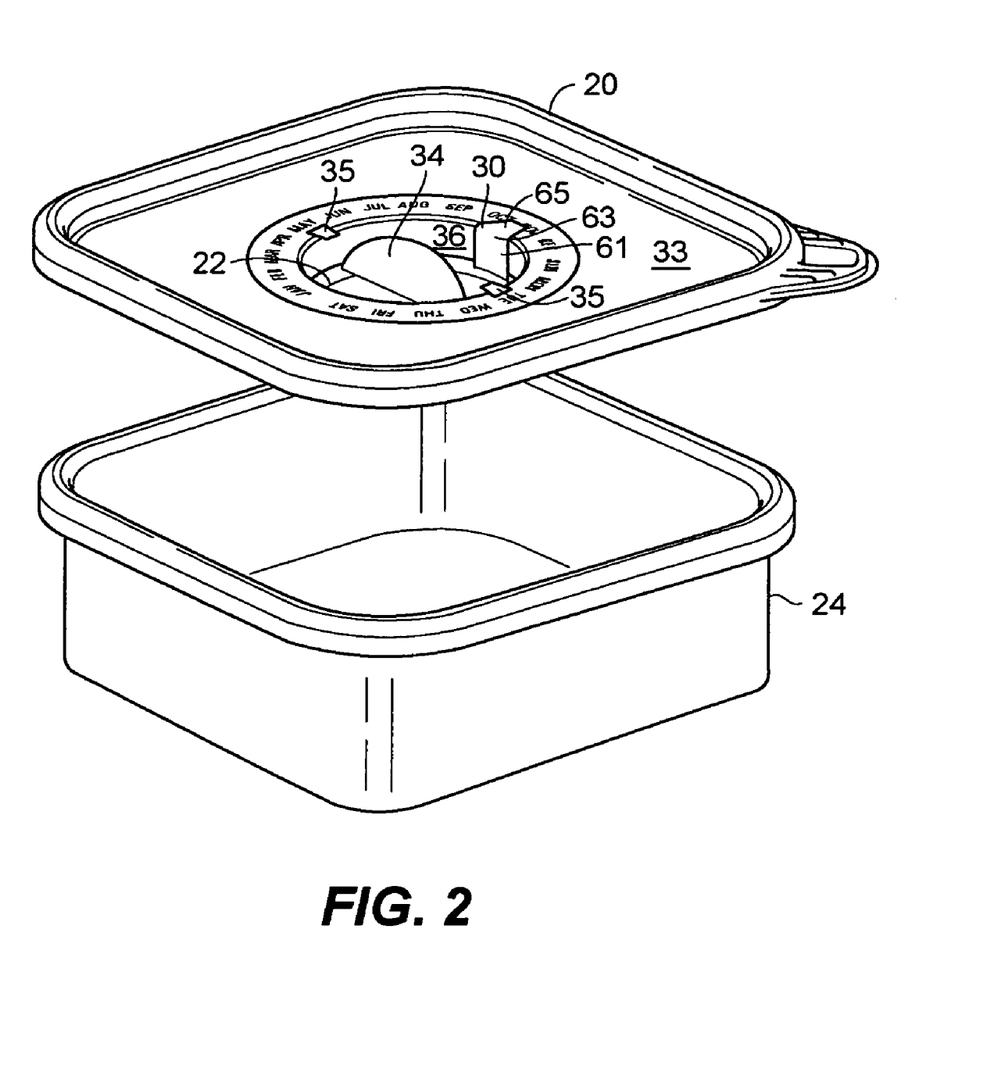
FIG. 2 is an exploded perspective view of a container with a lid and a dial constructed in accordance with the teachings of a second example of the present disclosure.

Referring to FIGS. 1 and 2, a container lid 20 with a dial 22 constructed in accordance with the teachings of the present disclosure is generally shown. The container lid 20 may be any size or shape to cover a correspondingly shaped container 24. The container lid 20 includes a recess 26 that rotatably houses the dial 22. The dial 22 includes a handle 34 that is pivotable between a stowed position folded into an upper surface 32 of the dial 22 and an operative position pivoted away from the upper surface 32 of the dial 22. In a first disclosed example, as shown in FIG. 1, the dial 22 includes information displayed thereon, while the lid 20 includes a pointer 28 that generally points toward the recess 26. To point to a particular information on the dial 22, the dial 22 can be rotated until the pointer 28 generally points to the particular information on the dial 22. In a second disclosed example, as shown in FIG. 2, the lid 20 includes information displayed thereon around the recess 26, while the dial 22 includes a pointer 30 that points radially outward. To point to a particular information on the lid 20, the dial 22 can be rotated until the pointer 30 generally points to the particular information on the lid 20.

Figure 3:
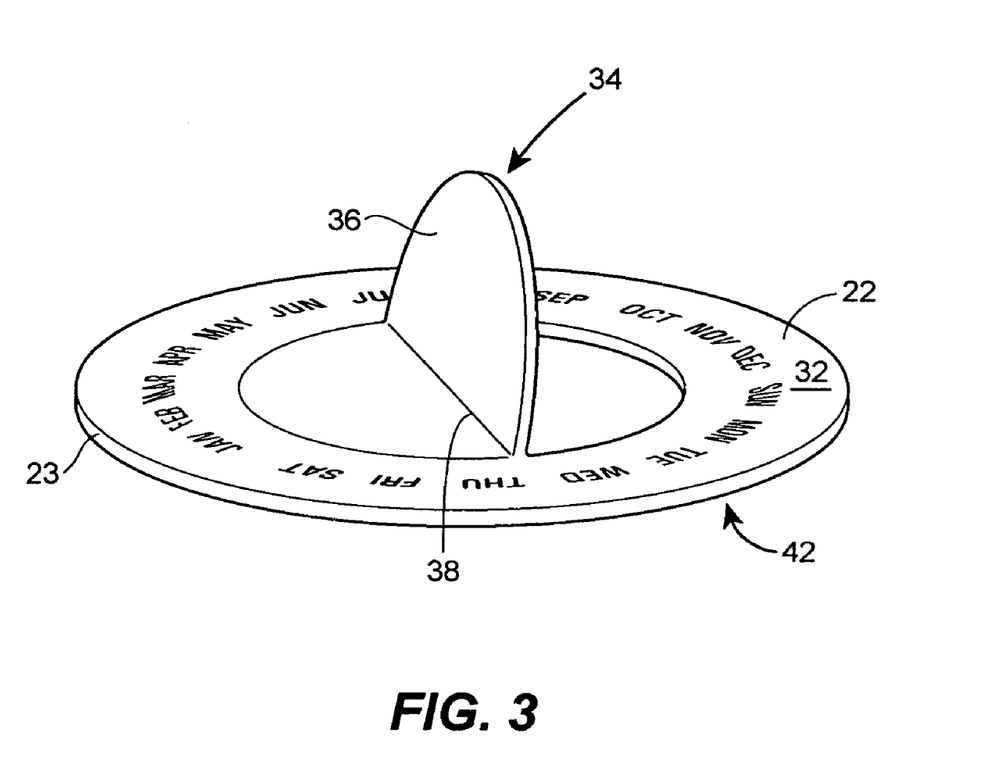
FIG. 3 is a side perspective view of a dial constructed in accordance with the teachings of the present disclosure.
Figure 4:
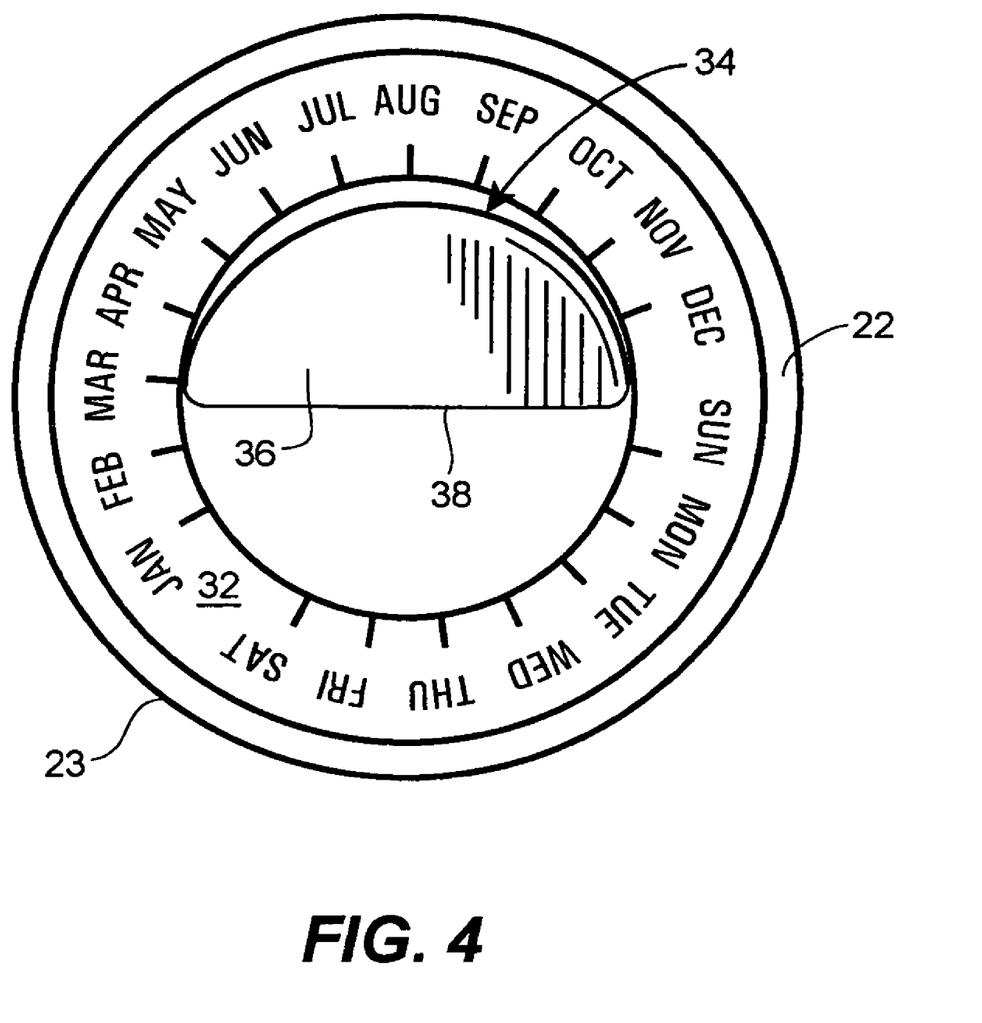
FIG. 4 is a top view of a dial constructed in accordance with the teachings of the present disclosure.

Referring to FIGS. 3 and 4, the dial 22 may be generally circular and include a handle 34 that transversely projects from an upper surface 32 of the dial 22. The dial 22 may be constructed from metal, plastic, paper products, wood products, or any other natural or artificial materials. The handle 34 may be constructed from the same material as the dial 22 or a different material. Also, the handle 34 may be an independent structure that is attached to the dial 22 or an integral part of the dial 22. As will become apparent from the following disclosed examples, however, the dial 22 and the handle 34 may be advantageously constructed from a cardboard material that is typically used for retail packaging of food products. Additionally, the handle 34 is formed from a portion of the dial 22.

In the disclosed examples, the dial 22 includes a generally semi-circular perforated portion 36, the ends of which are connected by a line 38 that is scored on the dial 22. The generally semi-circular perforated portion 36 can be separated and pulled away from the upper surface 32 of the dial 22. The pulling causes the semi-circular perforated portion 36 to bend along the score line 38 to form the handle 34. Accordingly, the handle 34 is generally semi-circular and transversely oriented relative to the upper surface 32 of the dial 22. Therefore, the handle 34 can pivot between a stowed position folded into the upper surface 32 of the dial 22 and an operative position pivoted away from the upper surface 32 of the dial 22.

When the handle 34 is formed as described above, the natural resilience of the cardboard material of the dial 22 may cause the handle 34 to partially return toward the upper surface 32 of the dial 22. The ability of the handle 34 to bend along the score line 38 allows the handle 34 to partially return to a position planar with the upper surface of the dial 22, i.e., the original position of the handle 22. For a container 24 with a shallow recess 26, returning of the handle 34 to its original position may be necessary if the handle 34 should not project outside the recess 26 to facilitate the stacking of one container 24 on top of another. However, regardless of the position of the handle 34 relative to the dial 22, a user can at any time grab the handle 34, bend it along the score line 38 to a desired position, and rotate the dial 22.

As described in the foregoing, the dial 22 can be constructed from material other than cardboard. The dial 22 may be constructed with a material that is either rigid and non-flexible, or more flexible that the cardboard dial 22 of the disclosed examples. For example, the dial 22 can be constructed from a thin aluminum sheet so that when the semi-circular perforated portion 38 is pulled away from the upper surface 32 of the dial 22, the handle 34 rigidly forms without partially returning toward the upper surface 32. In contrast, the dial 22 can be constructed from a highly flexible plastic material so that the semi-circular perforated portion 38 has to be pulled away from the upper surface 32 and held in an upright position during each use of the handle 34.

Referring to FIGS. 1 and 2, the recess 26 may be generally circular and positioned on an outer side 33 of the lid 20. The outer side 33 of the lid 20 is the side of the lid 20 that faces outward when the lid 20 is placed on the container 24 to cover the contents of the container 24. Although one recess 26 is described herein, one of ordinary skill in the art will readily appreciate that the lid 20 can include more than one recess 26. The recess 26 may include two or more tabs 35 that prevent the dial 22 from being easily removed from the recess 26. For a shallow recess 26 that may have a depth that is slightly larger than the thickness of the dial 22, the tabs 35 may be positioned on the lid 20 around the recess 26 so that portions thereof project into the recess 26. Although the recess 26 of FIG. 2 is not shown as having the noted shallow recess, the tabs 35 are shown as being positioned on the lid 20 as described. As shown in FIG. 1, for a deep recess 26, the tabs 35 may be positioned on the recess wall 36 such that all or portions of the tabs 35 generally project toward the center of the recess 26. One of ordinary skill in the art will readily appreciate that the tabs 35 constructively reduce the diameter of the recess 26 where they are positioned to a diameter that is below the diameter of the dial 22. Accordingly, the tabs 35 contact the upper surface 32 of the dial 22 when the dial 22 is being removed from the recess 26, thereby blocking the removal of the dial 22. The tabs 35 may be flexible so that the dial 22 can be removed from the recess 26 when pulled outwardly from the recess 26 with sufficient force. The flexibility of the tabs 35 also allows the dial 22 to be inserted in the recess 26 when pushed in the recess 26 with sufficient force. From the foregoing examples of the tabs 35, one of ordinary skill in the art will appreciate that other structures that substantially restrict movement of the dial 22 out of the recess 26 are similarly applicable to the lid 20. For example, the recess wall 36 may include a circumferential lip (not shown) that restricts the movement of the dial 22 outwardly from the recess 26.

A user can grab the handle 34 and rotate the dial 22 to a desired position. To maintain the dial 22 at the desired position in the recess 26, i.e., prevent free rotation of the dial 22, all or portions of a perimeter edge 23 of the dial 22 frictionally contact the recess wall 36. Alternately, an underside 42 of the dial 22 can frictionally engage a bottom surface (not shown) of the recess 26 to prevent free rotation of the dial 22 in the recess 26. Accordingly, any one of the perimeter edge 23 of the dial 22, the underside 42 of the dial 22, the bottom surface (not shown) of the recess 26, the recess wall 36, or various combinations thereof may be rough to provide enough frictional engagement to prevent free rotation of the dial 22. The noted frictional engagement may be provided with a plurality of small ribs, surface irregularities, dimples, projections, or other texture structures that are well known to those of ordinary skill in the art.

In the first disclosed example as shown in FIG. 1, the dial 22 can include a variety of information thereon that relate to items being stored in the container 24 for which the lid 20 and the dial 22 are used. The information on the dial 22 may include, but is not limited to, a listing of time increments, such as minutes or hours, a listing of date increments, such as days or months, a listing of various types of food products that may be stored in the container 24, or recipe information for the food products that may be stored in the container 24. In the disclosed examples, the dial 22 is shown and described as having date information in daily or monthly increments. However, one of ordinary skill in the art will readily appreciate the versatility of the dial 22 in providing numerous user selectable information.

In the first disclosed example as shown in FIG. 1, the lid can include the pointer 28. The pointer 28 may be an integral part of the lid 20. For example, the pointer 28 may be stamped, embossed on the lid 22, or formed when shaping the lid 20 during manufacture. The pointer 28 may also be adhesively attached to the lid 20. The pointer 28 is shown in FIG. 1 to be shaped like an arrow. The pointer 28, however, may simply be a line, a notch on the lid 20, or any other shape that conveys to a user a general direction to which the pointer 28 points. A user can rotate the dial 22 so that a desired information shown on the dial 22 is generally aligned with the pointer 28. The information being pointed to by the pointer 28 conveys to a user certain information about the contents of the container 24. For example, if the dial 22 includes the days of the week displayed thereon, a user can rotate the dial 22 so that the pointer 28 generally points to a particular day. The particular day may represent the day when a food item was placed in the container 24 for storage. Accordingly, a user can look at the dial 22 at any time subsequent to the day pointed to by the pointer 28 and determine the number of days that the food in the container 24 has been stored. The length of time by which a food product has been stored may indicate the freshness of the food product. In another example, the dial 22 can include information that conveys the amount of food that is remaining in the container 24. Every time a user removes a portion of the food from the container 24, he or she can rotate the dial 22 so that the pointer 28 generally points to the amount of food that is remaining in the container 24. Accordingly, the user can determine the approximate amount of food remaining in the container 24 at any time without having to remove the lid 20.

In the second disclosed example, as shown in FIG. 2, the lid 24 includes information while the pointer 30 is on the dial 22. The information on the lid 24 may be concentrically arranged in close proximity to the recess 26 so as to provide display uniformity with the generally circular shape of the dial 22 and the recess 26. The dial 22 includes the pointer 30 that radially points outward from the recess 26. The pointer 30 maybe displayed on the dial 22. Alternately, as shown in FIG. 2, the pointer 30 may be formed by a cutout portion 61 of the dial 22. The cutout portion 61 may include a riser 63 that perpendicularly projects from the dial 22 above the outer side 33 of the lid 20, and an indicator 65 that points to the information on the lid 20. The information on the lid 20 may include, but is not limited to, a listing of time increments, such as minutes or hours, a listing of date increments, such as days or months, a listing of various types of food products that may be stored in the container 24, or recipe information for the food products that may be stored in the container 24.

In the second disclosed example, a user can rotate the dial 22 so that the pointer 30 is generally aligned with a desired information on the lid 20. The information being generally pointed to by the pointer 30 conveys to a user certain information about the contents of the container 24 for which the lid 20 and the dial 22 are used. For example, if the lid 20 includes the days of the week displayed thereon, a user can rotate the dial 22 so that the pointer 30 generally points a particular day. The particular day may represent the day when a food item was placed in the container 24 for storage. Accordingly, a user can look at the lid 20 at any time subsequent to the day pointed to by the pointer 30 and determine the number of days that the food in the container 24 has been stored. The length of time by which a food product has been stored may indicate the freshness of the food product. In another example, the lid 20 can include information that conveys the amount of food that is remaining in the container 24. Every time a user removes a portion of the food from the container 24, he or she can rotate the dial 22 so that the pointer 30 generally points to the amount of food that is remaining in the container 24. Accordingly, the user can determine the approximate amount of food remaining in the container 24 at any time without having to remove the lid 20.

Figure 6:
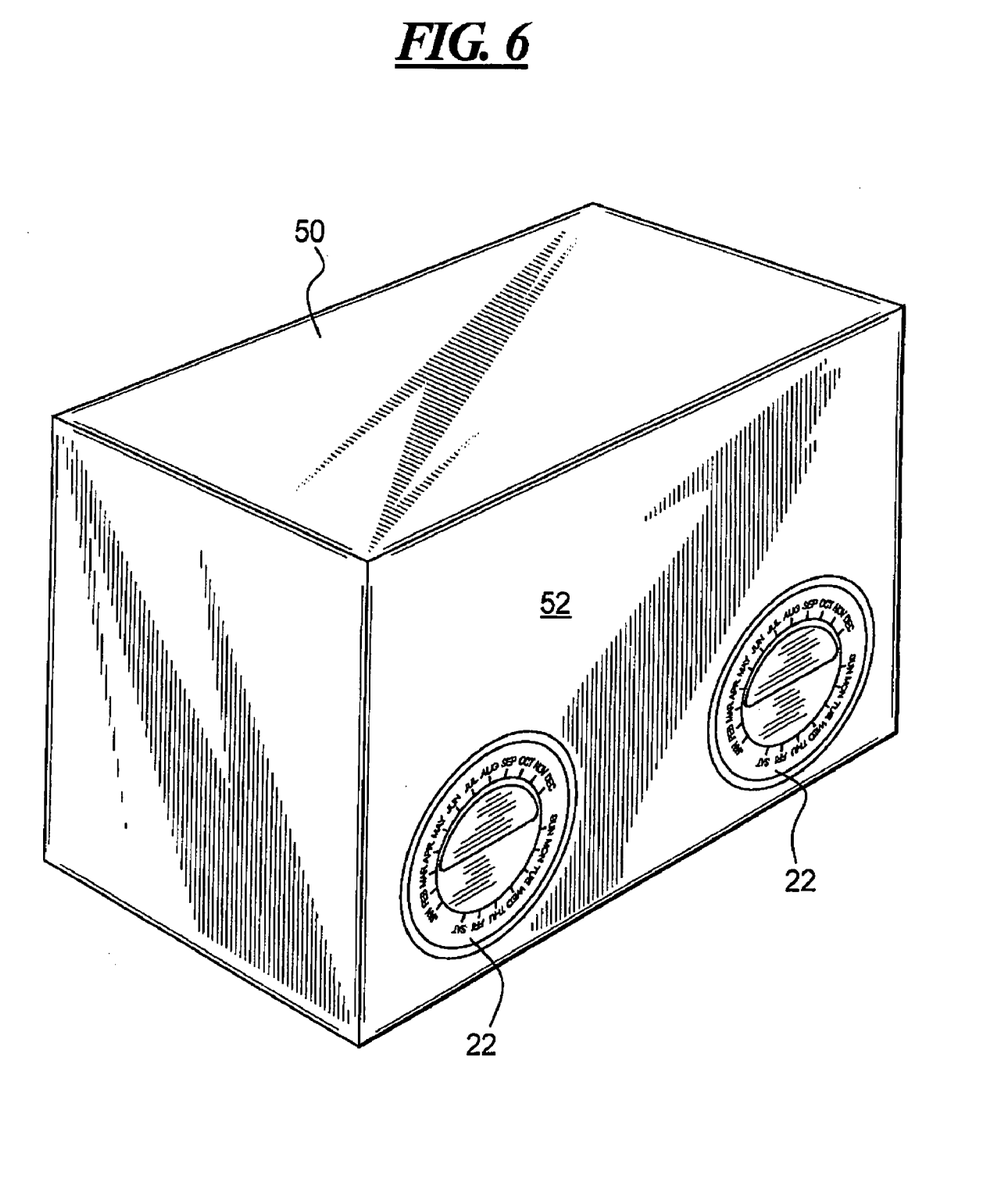
FIG. 6 is a perspective view of a food package having multiple dials incorporated integrally therein in accordance with the teachings of the present disclosure.

One of ordinary skill in the art will appreciate numerous methods by which one or more dials 22 can be provided to consumers for use with containers 24 having corresponding lids 20, as shown in FIG. 6. For example, when a user purchases a container 24 and a corresponding lid 20 that includes a recess 26, one or more dials 24 can be provided with the lid 20. For example, one or more dials 22 may be provided with the package in which the lid 20 is sold. The dial 22 may be cut out of the package by a user for use with the lid 20. If more than one dial 22 is provided, each dial may include different information thereon so that a user can use the dials 22 for different functions. Additionally, because the dial 22 is provided with the container 24 and lid 20, and not with a particular food item that a consumer may store in the container 24, the dial 22 may include generic information that is applicable to any food product. For example, a dial 22 having general date information displayed thereon can be used with any food product.

In the disclosed examples, a food product's package can include a dial 22 having information displayed thereon related to the food product. The dial 22 may include information that is not specific to the food product, such as date information, or information that is specific to the food product. The dial 22 can be included inside the food product's package. Accordingly, a consumer can remove the dial from the package and use the dial 22 in a lid 20 that will be used on a container 24 in which the food will be stored. Additionally, the consumer can be provided a several dials 22 that are part of a piece of cardboard (not shown). The perimeter of each dial 22 on the piece of cardboard is perforated so as to provide removal thereof from the piece of cardboard. In the disclosed examples, however, the dial 22 is an integral part of the food product's package and constructed from the same material as the package.

Figure 5:
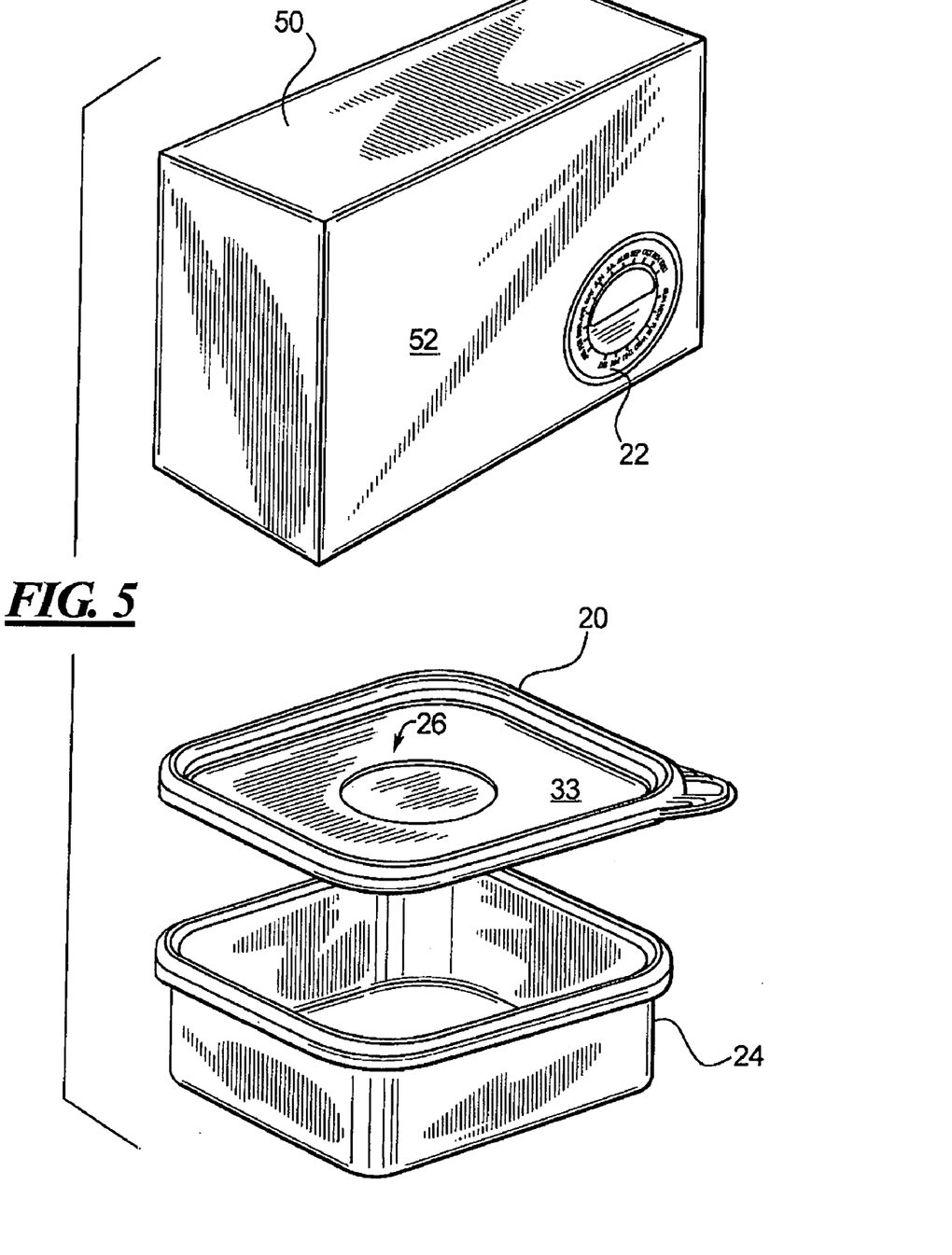
FIG. 5 is a perspective view of a food storage kit constructed in accordance with the teachings of the present disclosure.

Referring to FIG. 5, a food product package 50 in the shape of a rectangular box is shown. The dial 22 is shown to be an integral part of one of the panels 52 of the package 50. When the package is manufactured, the printing of information on the package can include printing of the information to be displayed on the dial 22. Additionally, during manufacturing of the package, a perimeter of the portion of the panel 52 that represents the dial 22 can be perforated as to provide easy removal of the dial 22 from the package 50. Therefore, each time a consumer buys a food product, the package 50 can include a dial 22 having information thereon that is either specific to the food product, or generic. The consumer can then use the dial 22 of the package 50 with an existing lid 20 and container 24 combination as shown in FIG. 5.

In yet another example, a consumer can be provided with a dial 22 that does not include any display of information, i.e., a blank dial 22. However, the consumer can then be provided with a variety of ring shaped information stickers 67 that can be placed on the dial 22. Accordingly, the consumer can place the stickers 67 on any blank dials 22. Additionally, the consumer can place the stickers 67 in an overlapping manner on dials 22 that already have information thereon from previous use. The stickers 67 can be provided with the food product package 50, sold with containers 24 and corresponding lids 20 or sold separately.

In yet another example, dials 22 may be provided that only have ornamental features. A dial 22 can include colors, graphics, pictures, text, or the like that convey to the consumer a particular festivity. For example, the colors and graphics on a dial 22 can be related to Halloween, Christmas, or other unique festivities. Accordingly, a consumer can place a dial 22 on the lid 20 during a festivity that is the theme of the dial 22. The dial 22 can indicate, for example, that the container 24 on which the dial 22 is used contains food items related to the particular festivity.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

What is claimed is:

1. A kit, comprising:
  a food product package having an information dial formed integrally therewith, the food product package containing a food product, the information dial including information specific to the food product, the information dial having a perimeter, the perimeter being perforated; and a container and lid combination separate from the food product package, the lid having a recess sized to receive the information dial.

2. The kit of claim 1, further comprising a pointer to indicate a position of the dial in the recess.

3. The kit of claim 2, wherein the dial includes information displayed thereon and the pointer is on the lid.

4. The kit of claim 2, wherein the lid includes information displayed thereon and the pointer is on the dial.

5. The kit of claim 1, wherein the dial includes a handle formed integrally therewith.

6. The kit of claim 1, wherein the dial engages the recess to prevent free rotation of the dial in the recess.

7. The kit of claim 1, further comprising a plurality of tabs to restrict the removal of the dial from the recess.

8. The kit of claim 1, wherein the dial includes date information.

9. A method of indicating information pertaining to contents of a container, comprising:

providing a food product package containing a food product the package having an information dial formed integrally therewith, the information dial including information specific to the food product, the information dial having a perimeter, the perimeter being perforated;

removing the information dial from the package;

storing the food product in a container separate from the food product package;

mounting the information dial in a recess in a lid; and attaching the lid to the container.

10. The method of claim 9, further comprising:

providing a second information dial formed integrally with the product package, the second information dial having a perimeter, the perimeter being perforated;

removing the second information dial from the recess; and mounting the second information dial in the recess.

* * * * *